United States Patent
Griswold

(10) Patent No.: US 6,242,823 B1
(45) Date of Patent: Jun. 5, 2001

(54) LINEAR ELECTRIC MACHINE

(76) Inventor: Wayne Griswold, 1025 W. Gates Dr., Roosevelt, UT (US) 84066

( * ) Notice: Subject to any disclaimer, the term of this patent is extended or adjusted under 35 U.S.C. 154(b) by 0 days.

(21) Appl. No.: 09/245,184

(22) Filed: Feb. 5, 1999

(51) Int. Cl.[7] ........................... H02K 33/16; H02K 35/04
(52) U.S. Cl. ................................................. 310/30; 310/12
(58) Field of Search ................................ 310/12, 13, 14, 310/23, 30, 34; 318/135; 335/224

(56) References Cited

U.S. PATENT DOCUMENTS

| | | | |
|---|---|---|---|
| 3,119,940 | 1/1964 | Pettit et al. | 310/24 |
| 3,504,320 | 3/1970 | Engdahl et al. | 336/110 |
| 4,210,831 | 7/1980 | Hurst | 310/13 |
| 4,217,507 | 8/1980 | Jaffe et al. | 310/12 |
| 4,243,899 | 1/1981 | Jaffe | 310/14 |
| 4,349,757 | 9/1982 | Bhate | 310/15 |
| 4,507,579 | 3/1985 | Turner | 310/23 |
| 4,542,311 | 9/1985 | Newman et al. | 310/13 |
| 4,675,563 | 6/1987 | Goldowsky | 310/15 |
| 4,937,481 | 6/1990 | Vitale | 310/15 |
| 5,136,194 | 8/1992 | Oudet et al. | 310/15 |
| 5,146,123 | 9/1992 | Yarr | 310/15 |
| 5,166,563 | 11/1992 | Bassine | 310/15 |
| 5,220,223 | 6/1993 | Mehnert | 310/14 |
| 5,231,336 | 7/1993 | van Namen | 318/128 |
| 5,631,505 | * 5/1997 | Stephany et al. | 310/12 |
| 5,744,879 | 4/1998 | Stoiber | 310/12 |
| 5,793,133 | 8/1998 | Shiraki et al. | 310/81 |
| 5,818,131 | 10/1998 | Zhang | 310/15 |
| 5,892,311 | * 4/1999 | Hayasaka | 310/166 |

* cited by examiner

Primary Examiner—Nestor Ramirez
Assistant Examiner—Judson H. Jones

(57) ABSTRACT

The present invention relates generally to linear electric machines, capable of converting electrical current into mechanical work or mechanical work into electrical current. More specifically, this invention relates to an electric machine having a ferromagnetic vessel containing a single-pole magnetic field, end caps for reflecting magnetic energy and a shaft having an electromagnetic coil which moves relative to the magnetic field.

25 Claims, 5 Drawing Sheets

LINEAR ELECTRIC MACHINE

BACKGROUND OF THE INVENTION

The present invention relates generally to linear electric machines, capable of converting electrical current into mechanical work or mechanical work into electrical current. More specifically, this invention relates to an electric machine having a ferromagnetic vessel containing a single-pole magnetic field, end caps for reflecting magnetic energy and a shaft having an electromagnetic coil which moves relative to the magnetic field.

Electric machines have been known in the art for decades. Motors, which generate mechanical energy from electric current, use the ability to create repulsive and/or attractive magnetic forces through the use of electromagnets to create movement. Generators, which create electrical current from mechanical energy function on the long known principle that movement of a wire loop through a magnetic field produces an electric current.

Typically these electric machines require electromagnetic windings to move in and out of different magnetic fields in order to function. It is heretofore unknown in the art to design an electric machine where the electromagnetic windings are able to move solely within a single-pole magnetic field.

Additionally, despite the fact that movement of electric wires through magnetic fields is known to generate electric current, and electric motors have electric wires which move through magnetic fields, the ability to design an electric motor which, during at least some portions of its cycle can generate at least some of the current necessary to drive the motor is unknown. A motor which could generate a portion of the electric current necessary to drive it would be significantly more energy efficient than a conventional motor where such internal generation is not possible and would be a significant advancement in the art.

SUMMARY AND OBJECTS OF THE INVENTION

The present invention involves a linear electric machine, whether motor or generator. This machine creates a single-pole magnetic field within a ferromagnetic vessel. The single-pole magnetic field can be created either by permanent, typically radially-poled, magnets or electromagnets and the ferromagnetic vessel can contain any material capable of reflecting the magnetic energy from the magnets into the vessel. This arrangement of the magnets, all with the same pole oriented within the vessel, creates a region of concentrated magnetic energy within the field, typically at or around the center of the magnets. In other words, where the single-pole magnetic field is a south pole field, a concentrated region of south pole magnetic energy exists, typically at or around the center of the magnets, within the south pole field.

Inside the single-pole magnetic field is positioned a shaft with an attached electromagnetic coil, the top and bottom of which are on opposite sides of the concentrated magnetic energy region. The configuration of the windings within the coil can also be optimized to further optimize the forces between the single-pole magnetic field and the coil. End plates, either attached to the coil or to the vessel further reflect the magnetic energy within the vessel.

When functioning as a motor, electric current is introduced into the coil of the shaft creating an electromagnet in the coil with the top and bottom of the coil containing the north and south poles. Since the top and bottom of the coil are on opposite sides of the concentrated magnetic energy region of the field, the opposite forces created by repulsion of the coil's like pole and attraction of the coil's opposite pole to the concentrated magnetic energy within the field produces linear force to move the coil and shaft relative to the magnetic field. As the coil, with its electromagnetic windings, moves through the electromagnetic field the movement of those electromagnetic windings through the field creates electric current generation, thereby reducing the quantity of electrical energy or current required to maintain the electromagnet in the coil and movement of the shaft.

As the top, or bottom depending on the shaft's direction, approaches the region of concentrated magnetic energy within the field, the direction or polarity of the current within the windings of coil is reversed thereby reversing the north and south poles in the coil and reversing the forces on and direction of the shaft. Repetition of the cycle and maintenance of the shaft and coil within the field creates a motor whose electrical consumption necessary for creation of mechanical energy is considerably less than that of standard electric motors.

When functioning as a generator, mechanical energy moves the shaft and coil relative to the field while maintaining the shaft and coil within the field in a reciprocating cycle identical to that described above with the motor. This movement of the electromagnetic windings of the coil through the magnetic field creates electric current, and like the motor, can accomplish the conversion of mechanical energy to electrical energy more efficiently than in conventional generators.

Accordingly, an object of the present invention is to create an electric machine capable of more efficiently producing both mechanical energy from electric energy and electric energy from mechanical energy.

Another object of the present invention is to create an electric machine which has a region of concentrated magnetic energy within a single-pole magnetic field capable of interacting with an electromagnetic coil.

It is yet another object of the present invention to create an electric machine where the moving parts stay within a single-pole magnetic field.

It is yet another object of the present invention to create winding configurations in electromagnetic coils moving within a single-pole magnetic field which can optimize the magnetic forces between the electromagnetic coil and the single-pole magnetic field.

These advantages in addition to other objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
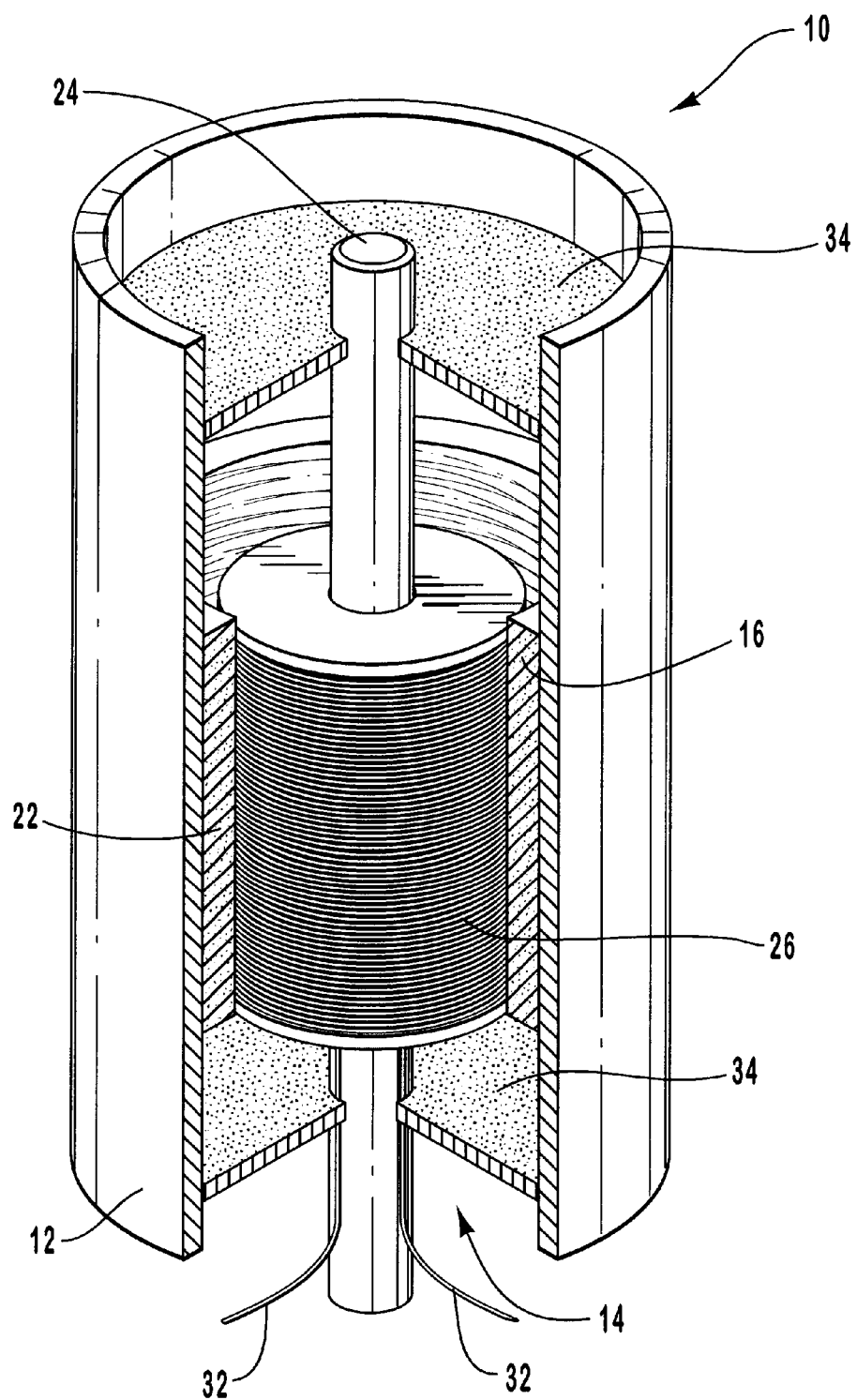
FIG. 1 is a perspective view of a linear electric machine with a portion of the vessel cut away to allow viewing of the machine components.

This invention provides for a linear electric machine 10, shown in FIG. 1, which can function interchangeably as either a motor or generator, depending on whether mechanical energy is introduced into the machine which will then generate electrical current or whether electrical current is introduced into the machine which then produces mechanical energy.

The linear electric machine 10 has a ferromagnetic vessel 12 having an interior cavity 14 which contains magnets 16. The vessel 12 can be an iron cylinder with other nonlimiting examples of additional ferromagnetic materials suitable for use within the vessel being ferrosilicates, cobalt, nickel and platinum group metals or any other material capable of concentrating or reflecting the magnetic energy from the magnets 16 into the vessel 12. Additionally, the ferromagnetic vessel 12 may also employ magnetically reflective coatings of different elements along the inside surface of a nonferromagnetic support vessel, usually a lightweight material such as aluminum, a polymer or a ceramic, to create the same or similar properties found in heavier, solid ferromagnetic vessels. These reflective coatings can also be used to improve the reflective properties of solid ferromagnetic vessels. The reflective coatings will be specific depending on the different type of magnets 16 employed within the vessel 12. For example, it has been found that a combination, from inside coating to outside coating, of iron (unnecessary if the underlying vessel is an iron or iron containing material), copper, bismuth, lead and tin functions well with barium ferrite magnets. Also a combination, again from inside coating to outside coating, of iron, copper, tungsten, copper, aluminum, bismuth, lead and tin functions well with neodymium magnets. Additionally, one skilled in the art will also understand that no limitation as to a cylindrical shape of the vessel exists.

Figure 2:
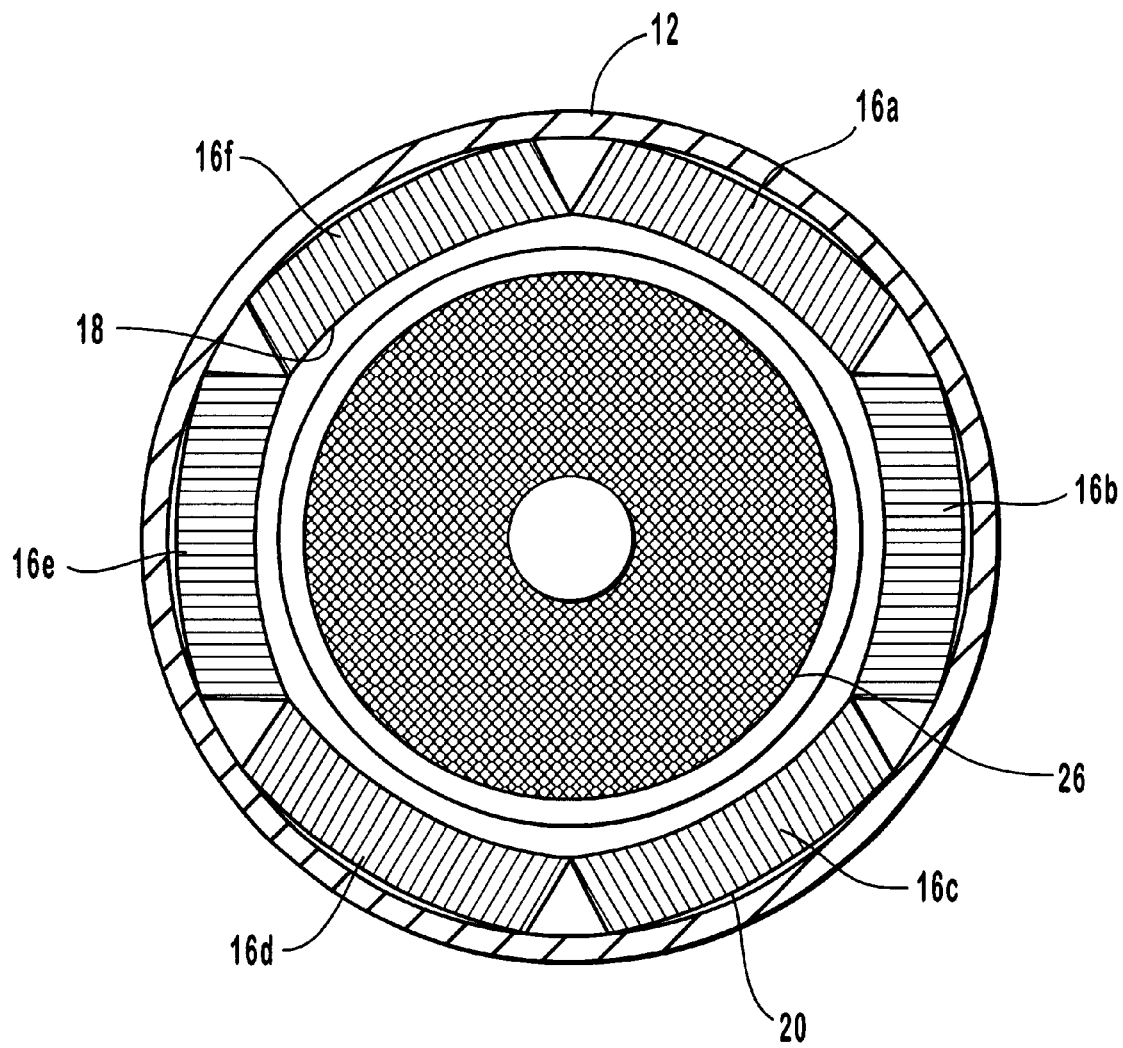
FIG. 2 is a top view of magnets contained within the vessel.

The magnets 16 are oriented such that a single-pole magnetic field is created inside the vessel's cavity 14. In the presently preferred embodiment shown in FIG. 2, the single-pole magnetic field is created by multiple radially poled permanent magnets 16A–16F arraigned around the inside surface of the cylindrical vessel 12. The inner surface 18 of each of the magnets 16A–16F contains a south magnetic pole, thereby creating a south magnetic pole field radially oriented into the center of the vessel 12. The outer surface 20 of each of the magnets 16A–16F will naturally then have a north magnetic pole. It is also within the scope of the present invention to create the single-pole magnetic field using electromagnets rather than permanent magnets.

It has been discovered that such a single-pole magnetic field within the vessel cavity 14 has a concentrated magnetic region at or around the middle 22 of the magnets 16 contained within the vessel 12. The exact dimensions and position of this concentrated magnetic region will vary depending such variables as the length of the magnets, the shape and width of the vessel, the type and strength of magnets and the reflective properties of the vessel.

A shaft 24 having electromagnetic coil 26 attached moves in a linear, reciprocating cycle through the single-pole magnetic field. The use of magnetically reflective coatings around the shaft 24 has also been found to increase overall efficiency. In addition to the coating combinations already described, where stainless steel shafts are employed a combination of copper, iron and bismuth coatings has been found especially effective with barium ferrite magnets and a combination of aluminum and iron coatings effective with neodymium magnets. The shaft 24 can then be connected either to a source of mechanical energy when the machine 10 is functioning as a generator, or, if the machine is functioning as a motor, the shaft transmits the created mechanical energy out of the machine 10.

Figure 3:
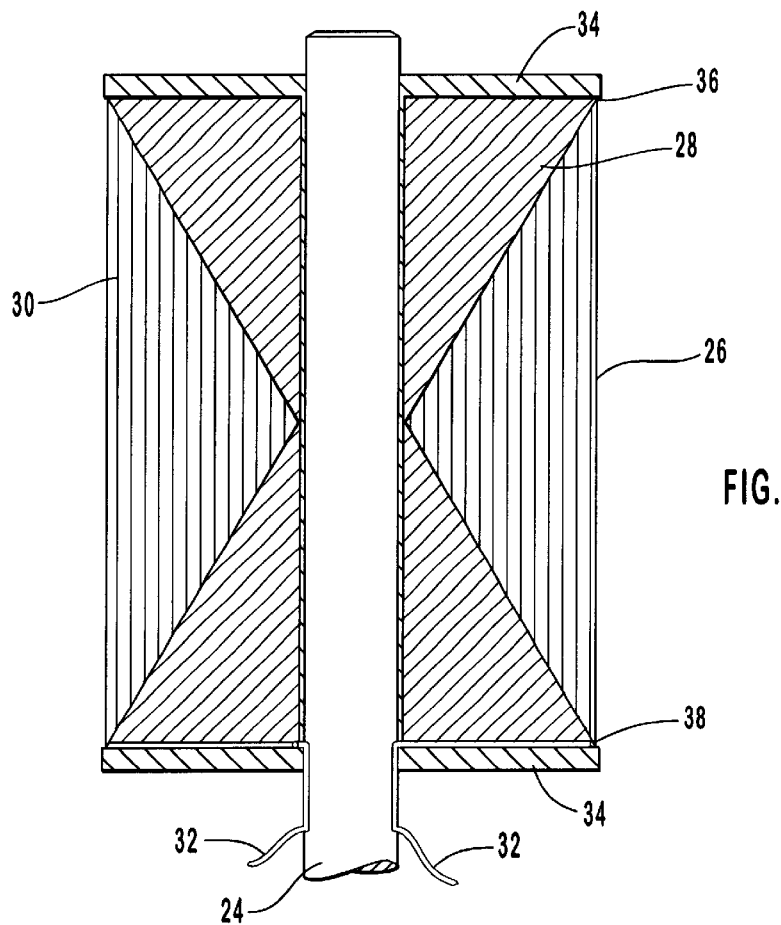
FIG. 3 is a cut away view of the windings contained within an electromagnetic coil.

In a preferred embodiment the electromagnetic coil 26 contains at least a two step winding configuration as shown in FIG. 3. In the first step the coil is wound into an hour-glass shape 28. After the hour-glass configuration is wound onto the shaft 24, a second step of filler windings 30 create the relatively uniform thickness electromagnetic coil 26. Additionally, choke windings can also be added over the outside of the filler windings 30. Wires 32 are attached to the coil 26 and allow current introduction into the coil when the machine is functioning as a motor and also allow generated current to exit the coil when the machine is functioning as a generator.

Additionally, end caps 34 are also used to reflect magnetic energy into the vessel cavity 14. These end caps are placed proximate to the coil 26 and can be placed on the top 36 and bottom 38 ends of the coil 26, as demonstrated in FIG. 3, or attached to the vessel 12 as shown in FIG. 1 where the point of attachment for the end caps 34 is at a point just above the highest point reached by the top end 36 of the coil 26 and just below the lowest point reached by the bottom end 38 of the coil 22 during the reciprocal cycle. Typically, the end caps will contain ferromagnetic metals such as iron, cobalt, nickel and/or platinum, although polymer end caps are also capable of performing the desired function. Like the vessel 12 and shaft 24, the end caps 34 may also utilize elemental coatings in connection with solid metal or polymer caps when the electric machine 10 is used as either a motor or generator.

Figure 4:
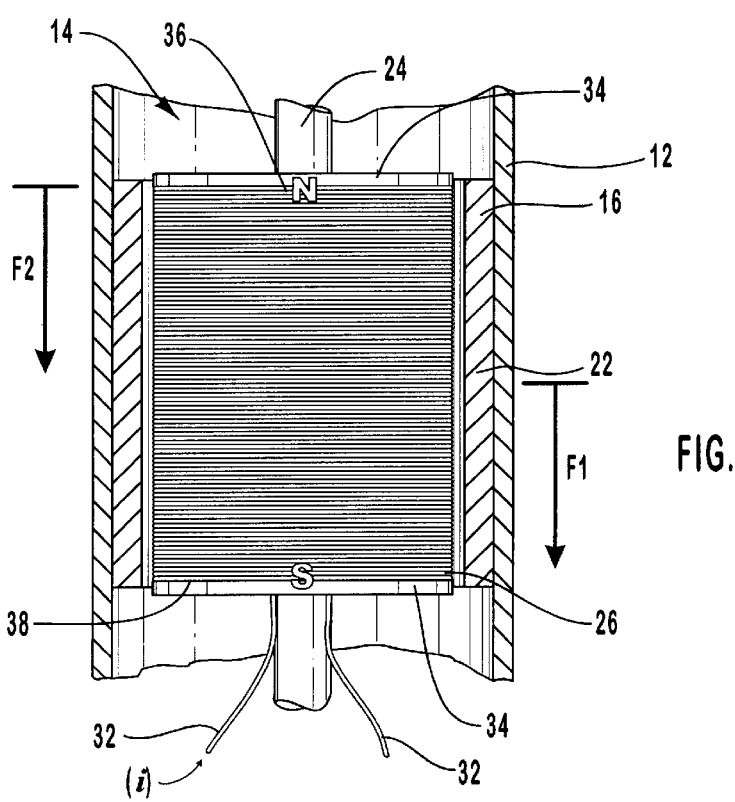
FIGS. 4–6 demonstrate the linear reciprocal cycle of an electromagnetic coil through a south-pole magnetic field.
Figure 5:
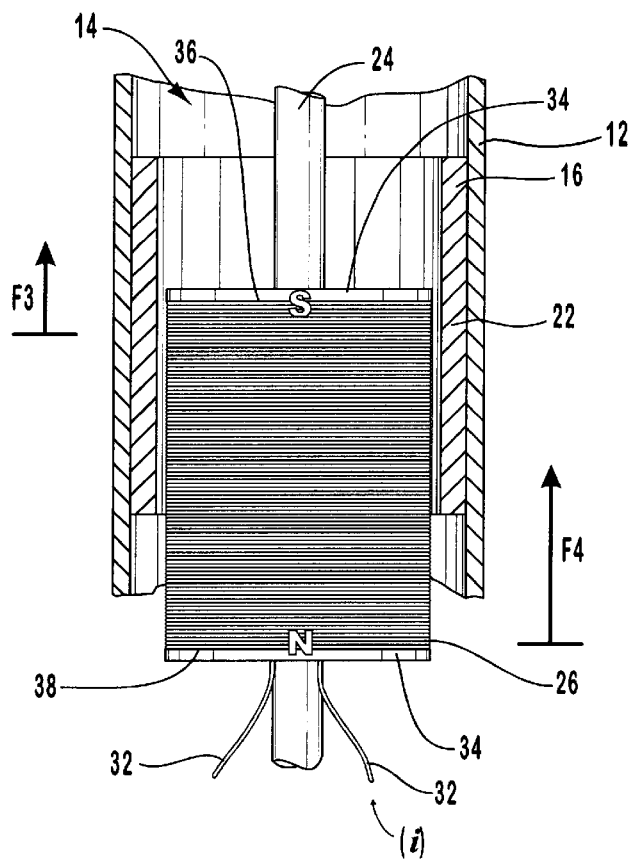
Figure 6:
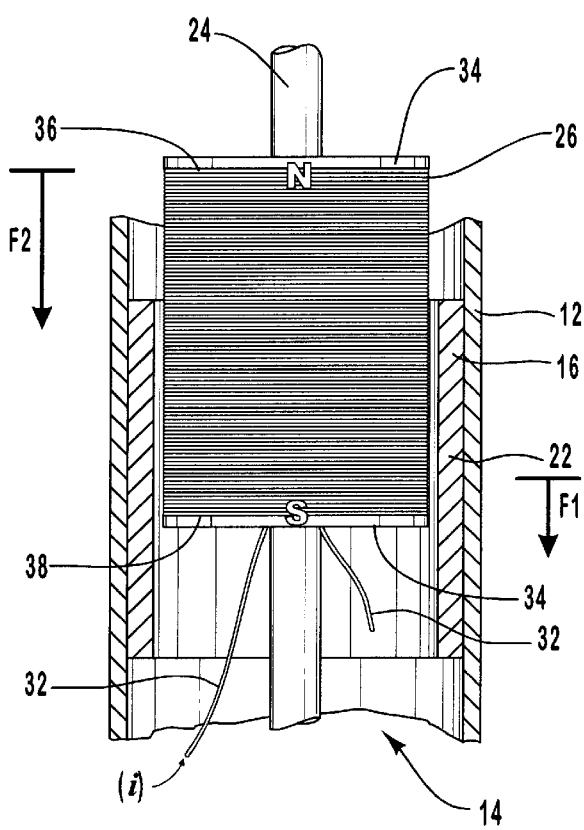

FIGS. 4–6 demonstrate the linear reciprocating cycle of movement of the coil 26 through the magnetic field in an embodiment of the electric machine 10 functioning as a motor. In FIG. 4 the shaft 24 and attached coil 26 are oriented within a south magnetic pole field such that the top 36 and bottom 38 ends of the coil 26 are on either side of the concentrated magnetic region located around the middle 22 of the magnets 16. Electric current (i) is introduced into the coil 26 through the wires 32 thereby creating an electromagnet in the coil with a north magnetic pole at the top end 36 of the coil 26 and a south magnetic pole at the bottom end 38 of the coil 26. Natural magnetic repulsion of the south pole at the bottom end 38 of the coil 26 with the concentrated south pole magnetic region of the magnets creates a downward force F1. Simultaneously, the attraction of the north pole at the top end 36 of the coil 26 with the concentrated south pole magnetic region also creates a downward force F2. These two downward forces, F1 and F2 then work in combination to move the shaft 24 down.

As the electromagnetic windings of the coil 26 move down through the south pole magnetic field, electric current is naturally produced in the wires of the coil. The quantity of generated electric current will be primarily function of the quantity and orientation of such variables as the windings within the coil 26, the strength of the single-pole magnetic field including the ability of the ferromagnetic vessel 12 and end caps 28 to reflect the magnetic energy into the vessel cavity 14 as well as the velocity of the coil 26 within the single-pole magnetic field. As the coil 26 begins to move through the single-pole magnetic field electric current begins to be generated within the coil 26. This generated current initially reduces and ultimately eliminates the need of electric current input into the coil for a portion of the cycle as the generated current is able to maintain the electromagnet within the coil 26. In addition for a period of time during the cycle the movement of the coil 26 within the single-pole magnetic field generates excess current. This excess generated current can either exit the coil through the wire 32 and then be stored to further reduce the motor's overall electric consumption or it can be used increase the electromagnetic forces in the coil 26, thereby increasing the mechanical energy created in the shaft 24 without the input of any external electric current.

The shaft 24 and attached coil 26 continue through the south pole magnetic field until the top end 36 of the coil 26 approaches concentrated region of magnetic energy around the middle 22 of the magnets 16, as shown in FIG. 5. As the top end 36 of the coil 26 approaches the middle 22 of the magnets 16 the direction of the electric current (i) is switched. This now creates a south magnetic pole at the top end 36 of the coil 26 which creates a repulsive force F3 which now acts to move the shaft 24 up. Simultaneously, the switch in the direction of electric current also creates a north magnetic pole at the bottom end 38 of the coil 26 which creates an attractive force F4 and which also acts to move the shaft 24 in an upward direction.

As the electromagnetic windings of the coil 26 move up through the south pole magnetic field, electric current is again generated in the wires of the coil. This generated electric current again maintains the electromagnetic north and south poles in the coil 26, thereby eliminating the need electric current input into the coil 26 for a portion of the cycle. In addition, for a period of time during the cycle the movement of the coil 26 within the single-pole magnetic field generates excess current which can either exit the coil through the wire 32 and then be stored to further reduce the motor's overall electric consumption or the excess current can be used increase the electromagnetic forces in the coil 26, thereby increasing the mechanical energy created in the shaft 24 without the addition of any additional external electric current.

FIG. 6 shows the cycle completed and ready for repetition. As the bottom end 38 of the coil 26 approaches concentrated region of magnetic energy around the middle 22 of the magnets 16, the direction of the electric current (i) is again switched to its initial direction. This now recreates a south magnetic pole at the bottom end 38 of the coil 26, thereby recreating the repulsive force F1, and also simultaneously recreated a north magnetic pole at the top end 36 of the coil 26 thereby recreating the attractive force F2 and causing the shaft 24 to now be urged down again.

Figure 7:
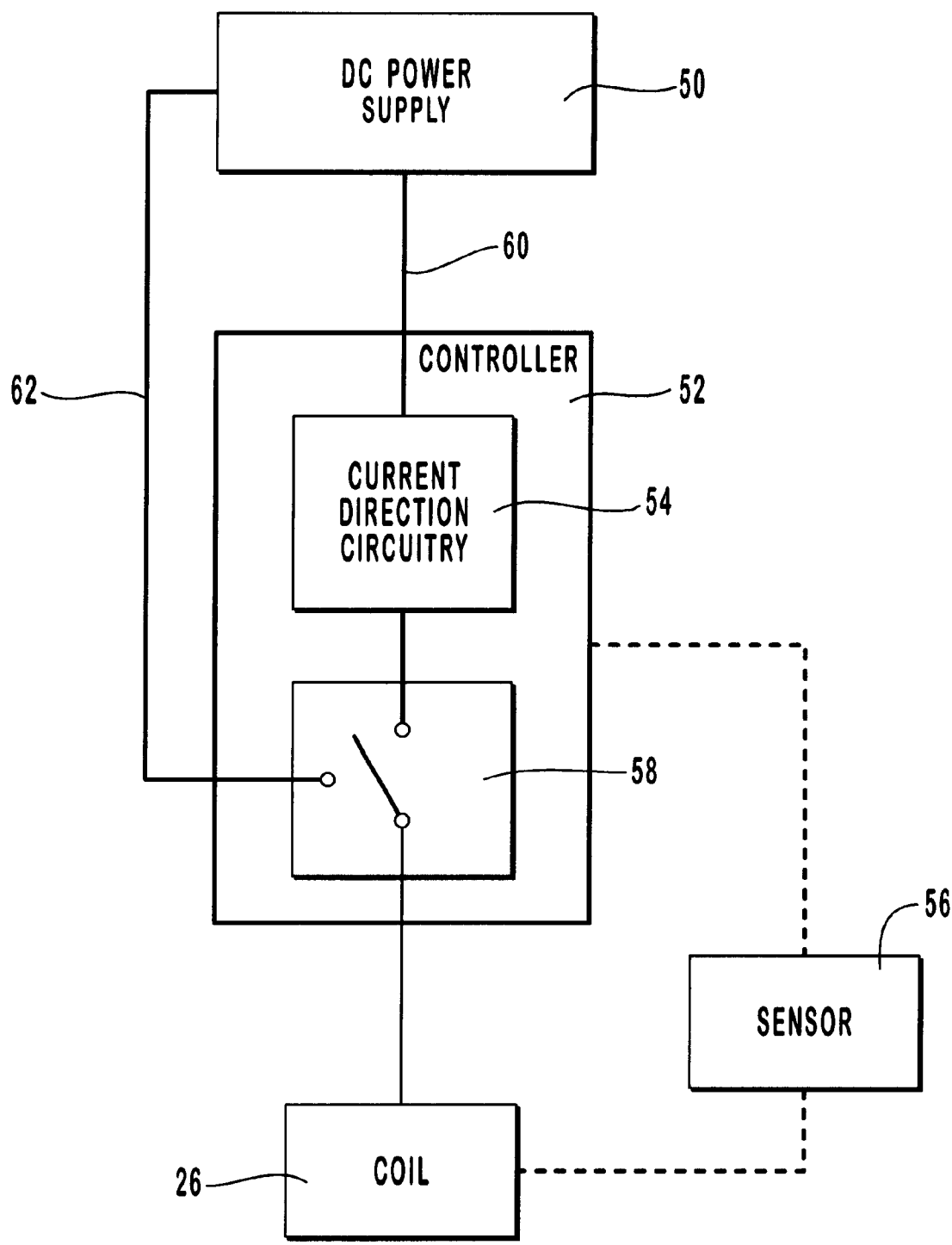
FIG. 7 is a block diagram of an embodiment of the control circuitry for the linear electric machine.

The repetition of the above linear reciprocating cycle can be readily accomplished by repeatedly switching the direction of the electric current (i) as the shaft 24 and coil 26 move through the single-pole magnetic field as shown in FIGS. 4–6. One skilled in the art will recognize that the mechanism used to switch the direction of the current (i) introduced into the coil 26 can take multiple forms. In a presently preferred embodiment shown in FIG. 7, a direct-current power source 50, typically comprised of batteries, is connected to a controller 52 containing electronic circuitry. The controller's circuitry performs two functions. First, the controller 52, changes the direction or polarity of the current (i), creating an alternating current, sent into the coil 26 which is shown as current direction circuitry 54. A sensor 56 provides the input into the controller 52 indicating when the direction of the current (i) should be switched. This sensor 56, whether mechanical, optical, magnetic or otherwise, monitors the position of the coil 26 or the shaft, not shown, or any other component or property which indicates the position of the coil 26 within the single-pole magnetic field within the vessel, also not shown. Also within the controller 52 is a switching device 58 which is also controlled by the input from the sensor 56. As described above, electric current input from the direct-current power source 50 into the coil 26 is not necessary through the entire reciprocating cycle of the coil. Additionally, electric current in excess of the current needed to maintain the electromagnetic field of the coil can be generated by the coil. This excess generated current can then be withdrawn from the coil 26 and stored. When input electric current is required by the coil 26, the switching device 58 allows the flow of electric current input, in whichever direction or polarity necessary, from the direct-current power supply 50 through the DC power supply input wire 60 to enter the coil. When the input electric current is no longer required, the switching device 58 then disconnects the input electric current and allows the generated electric current from the coil 26 to exit the coil and recharge the batteries which make up the direct-current power supply 50 though recharging wires and circuitry 62.

Inasmuch as standard alternating current is electric current with the direction of the current switched at a set frequency, as the RPMs of the linear reciprocating cycle increase the input current into the coil 26 from the controller 52 becomes more like a standard alternating current electric input. Consequently, at the proper speeds the machine 10 can function on standard alternating electric current input which then replaces the direct-current power source 50 and the current direction circuitry 54 of the controller 52. Although the alternating electric current input replaces the power source 50 and the current direction circuitry 54 of the controller 52, the switching device 58 still acts to disconnect the input electrical current into the coil 26 while also allowing generated electrical current to exit the coil.

One skilled in the art will recognize that the same fundamental principles demonstrated the electric motor embodiment shown in FIGS. 4–6 also apply to the embodiment of the electric machine 10 as a generator. Instead of requiring the introduction of electric current (i) into the coil 26 to produce movement of the shaft 24, the generator contains an external source of mechanical energy which allows the machine 10 to produce electric current (i) from external movement of the shaft 24 which current exists the machine through the wires 32. As the shaft 24 and coil 26 move up through the magnetic field, current is generated in a given direction and when the shaft 24 and coil 26 move down through the magnetic field current in the opposite direction is generated. Whether this generated alternating current (i) exiting the coil 26 is fed into a rectifier to produce direct current output or whether the alternating current, whose frequency will simply be a function of the RPMs of the reciprocal cycle of the shaft 24 and coil 26, is used directly will be a function of the ultimate function of the power generated.

While the above embodiments describe the shaft 24 and coil 26 moving with respect to the stationary vessel 12 and magnets 16, one skilled in the art will recognize that the force created or electric current generated is a function of the movement of the shaft and its coil relative to the concentrated magnetic region created by the magnets. It is within the scope of the present invention to allow the magnets to move while holding the shaft and its coil stationary. Equally within the scope of the invention are embodiments where both magnets and shaft move relative to the other.

Additionally, the above description details a machine having one cavity and one single-pole magnetic field through which one shaft with attached coil moves. One skilled in the art will recognize that the scope of the present invention includes embodiments containing multiple cavities, with each cavity containing a single-pole magnetic field with a shaft and attached coil moving through that single-pole magnetic field. Typically such multiple cavity embodiments will contain at least one crankshaft to which multiple shafts with attached coils are connected.

Additional embodiments of the present invention employ a single cavity and a single shaft which passes through multiple single-pole magnetic fields contained within the cavity. The shaft in such an embodiment may contain a single elongated coil that moves through each single-pole magnetic field and/or multiple coils which each move within one single-pole magnetic field.

Although preferred embodiments of the invention are described herein in detail, it will be understood by those skilled in the art that variations may be made thereto without departing from the spirit of the invention or the scope of the claims.

What is claimed and desired to be secured by United States Letters Patent is:

1. A linear electric machine comprising:
   (a) a ferromagnetic vessel containing one or more magnetic elements, said magnetic elements arranged to produce a single-pole magnetic field;
   (b) an electromagnetic coil being disposed within said single-pole magnetic field;
   (c) an end cap proximate to said coil; and
   (d) input means for causing movement of said coil relative to said magnetic elements.

2. The linear electric machine of claim 1 wherein said input means comprises mechanical energy means, mechanically coupled to said magnetic elements, for supplying mechanical energy to said magnetic elements so as to cause said magnetic elements to move back and forth in a reciprocating cycle relative to said coil.

3. The linear electric machine of claim 1 wherein said input means comprises mechanical energy means, mechanically coupled to said coil, for supplying mechanical energy to said coil so as to cause said coil to move back and forth in a reciprocating pattern relative to said magnetic elements.

4. The linear electric machine of claim 1 wherein said input means comprises electrical energy means, electrically coupled to said coil, for supplying an alternating electric current to said coil so as to cause said coil to move back and forth in a reciprocating pattern relative to said magnetic elements.

5. The linear electric machine of claim 1 wherein said input means comprises electrical energy means, electrically coupled to said coil, for supplying an alternating electric current to said coil so as to cause said magnetic elements to move back and forth in a reciprocating pattern relative to said coil.

6. The linear electric machine of claim 2 or 3 further comprising output means, electrically coupled to said coil, for outputting electrical energy generated by said machine as a result of the movement of said magnetic elements and said coil relative to one another.

7. The linear electric machine of claim 4 or 5 further comprising output means, electrically coupled to said coil, for outputting electrical energy generated by said machine as a result of the movement of said magnetic elements and said coil relative to one another.

8. The linear electric machine of claim 4 further comprising output means, mechanically coupled to said coil, for transferring the mechanical energy generated by the movement of said coil and said magnetic elements relative to one another.

9. The linear electric machine of claim 5 further comprising output means, mechanically coupled to said magnetic elements, for transferring the mechanical energy generated by the movement of said coil and said magnetic elements relative to one another.

10. The linear electric machine of claim 1 wherein said magnetic elements are permanent magnets.

11. A linear electric machine of claim 1 wherein said magnetic elements are electromagnets.

12. A linear electric machine comprising:
    (a) a ferromagnetic containing vessel having an internal cavity;
    (b) one or more magnetic elements within said cavity creating a single-pole magnetic field within said cavity, said single-pole magnetic field having a region of concentrated magnetic energy;
    (c) an end cap proximate to an electromagnetic coil; and
    (d) said coil being disposed within said single-pole magnetic field, such that at least a portion of said coil extends through said region of concentrated magnetic energy, wherein said coil moves relative to said magnetic elements.

13. The linear electric machine of claim 12 wherein said coil is attached to a shaft.

14. The linear electric machine of claim 12 wherein said end cap is attached to said coil.

15. The linear electric machine of claim 12 wherein said coil contains at least a two-step winding configuration, with said first step having hour-glass shaped windings and said second step having filler windings.

16. The linear electric machine of claim 12 wherein said end cap contains ferromagnetic materials.

17. The linear electric machine of claim 16 wherein said end cap contains materials from the group comprising iron, cobalt, nickel, and platinum.

18. The linear electric machine of claim 13 wherein said magnetic elements remain stationary and said shaft moves in a reciprocal, liner cycle.

19. The linear electric machine of claim 12 wherein said movement of said coil relative to said magnetic elements generates electric current within said coil.

20. The linear electric machine of claim 12 wherein said magnetic elements are barium ferrite magnets and wherein said ferromagnetic containing vessel further contains coatings of copper, bismuth, lead and tin.

21. The linear electric machine of claim 12 wherein said magnetic elements are neodymium magnets and wherein said ferromagnetic containing vessel further contains coatings of copper, tungsten, copper, aluminum, bismuth, lead and tin.

22. A linear electric machine comprising:
    (a) a ferromagnetic containing vessel having an outside surface and an inside surface;

(b) one or more magnetic elements attached to said inside surface of said vessel creating a single-pole magnetic field within said vessel, said single-pole magnetic field having a region of concentrated magnetic energy;

(c) an electromagnetic coil, said coil having a top end and a bottom end and wherein at least a portion of said coil extends through said region of concentrated magnetic energy;

(d) a top end cap attached to said top end of said coil and a bottom end cap attached to said bottom end of said coil;

(e) a shaft attached to said coil wherein said shaft and said coil move within said single-pole magnetic field in a reciprocal, linear cycle, said movement of said coil within said single-pole magnetic field capable of generating electric current.

23. A linear electric machine comprising two or more ferromagnetic containing vessels, each vessel having:

(a) one or more magnetic elements, said magnetic elements arraigned to produce a single-pole magnetic field;

(b) an electromagnetic coil being disposed within said single-pole magnetic field;

(c) an end cap proximate to said coil; and (d) input means for causing movement of said coil relative to said magnetic elements.

24. The linear electric machine of claim 23 wherein said machine further comprises a crankshaft mechanically connected to said electromagnetic coils of each of said vessels.

25. A linear electric machine comprising (a) a ferromagnetic vessel having a cavity, said cavity having at least two single-pole magnetic fields within said cavity;

(b) a shaft attached to a source of mechanical energy, said mechanical energy moving said shaft in a reciprocating cycle;

(c) an electromagnetic coil attached to said shaft, which said coil moves through each of said single-pole magnetic fields;

(d) an end cap proximate to said coil; and (e) output means, electrically coupled to said coil, for outputting electrical energy generated by said machine as a result of the movement of said shaft and coil relative to said single-pole magnetic fields.

* * * * *